3,350,386

PROCESS FOR THE PURIFICATION OF HYDROXYALKYL ETHERS OF GALACTOMANNANS

Konrad Engelskirchen, Lank, and Joachim Galinke, Dusseldorf-Holthausen, Germany, assignors to Henkel & Cie. G.m.b.H., Dusseldorf-Holthausen, Germany, a corporation of Germany No Drawing. Filed Apr. 28, 1965, Ser. No. 451,613
Claims priority, application Germany, May 2, 1964, H 52,575
7 Claims. (Cl. 260—209)

This invention relates to a process for purifying hydroxyalkyl ethers of naturally occurring galactomannans such as guar and locust bean flour (Carubin).

Hydroxyalkyl ethers of galactomannans, in particular the hydroxyethyl and hydroxypropyl ethers, are well known. These hydroxyalkyl ethers of galactomannans are customarily prepared by allowing alkalis, and in particular sodium hydroxide, and an alkylene oxide to act on the natural galactomannans. The isolations of the hydroxyalkyl ethers after the hydroxy alkylation reaction is usually effected by subjecting the raw product obtained, with or without neutralization, to drying, after having been filtered. However, by this process only a small amount of the alkali or, in case of prior neutralization, a small amount of the salts formed is removed. The removal of the bulk of the impurities is difficult, as the hydroxyalkyl ethers of the galactomannans as well as the alkali or the alkali salts are easily soluble in water. The impurities, reported as sulfate ash content are in excess of 3% and often as much as 25 to 30% in these hydroxyalkyl ethers of galactomannans.

An object of the present invention is the development of a process for the purification of a hydroxy-lower-alkyl ether of galactomannan which comprises the steps of contacting an impure hydroxy-lower-alkyl ether of galactomannan having a sulfate ash content in excess of 3%, at an acid pH value with glyoxal, separating the reaction product, washing the reaction product with water having a pH of from 2 to 6 at a temperature of from 0° to 40° C. and recovering a purified hydroxy-lower-alkyl ether of galactomannan having a low sulfate ash content.

Another object of the present invention is the obtention of a substantially pure hydroxy-lower-alkyl ether of galactomannan having a low sulfate ash content by the process of the invention.

These and other objects of the present invention will become more apparent as the description thereof proceeds.

Now, a process for purification of hydroxy-lower-alkyl ethers of galactomannans has been discovered, which allows by a simple method to obtain hydroxy-lower-alkyl ethers of the galactomannans of low salt content, particularly having a salt content of under 3%, reported as sulfate ash. This new process is characterized in that the hydroxy-lower-alkyl ether of galactomannan to be purified are treated at an acid pH value with glyoxal, then they are washed either once or several times with water having a pH of from 2–6, preferably of from 3–5, at a temperature of 0–30° C., preferably 0–20° C., and recovered, preferably by drying.

The hydroxy-lower-alkyl ethers of galactomannans to be purified may be prepared according to methods commonly known. For example, guar or locust bean flour is dispersed in an organic solvent which is substantially inert and practically non-reacting under the reaction conditions with alkylene oxide and further at least partially watermiscible. Then the dispersed flour is admixed with an aqueous alkali, such as an alkali metal hydroxide solution, and after a short time, a lower alkylene oxide, preferably ethylene oxide and/or propylene oxide, is added to the mixture. If so desired, the reaction may be conducted at elevated temperature and/or under pressure.

As dispersing agents for the galactomannans are organic solvents that are substantially inert and practically non-reacting with alkylene oxides and are partially watermiscible. The following are considered: secondary or tertiary lower alkanols such as isopropanol, isobutanol, isopentanol, tertiary butanol; furthermore lower alkanones such as acetone, methylethylketone, etc. Moreover, the usage of dioxane or alkoxy ethers is feasible in principle. The solvents are used either individually or as mixtures, as a rule in sufficiently large amounts, so that easily stirrable or pumpable dispersions of the galactomannans or obtained.

The purification process, according to the invention, relates in general to hydroxy-lower-alkyl ethers of galactomannans, although primarily the hydroxyethyl ethers and/or the hydroxypropyl ethers of guar or locust bean flour are utilized, if necessary as admixtures. The ethers mentioned above may also contain hydroxybutyl radicals. The hydroxy-lower-alkyl ethers of the galactomannans may also be substituted in addition to the hydroxy-lower-alkyl groups to a lesser degree by methyl, ethyl or propyl radicals. The process according to the invention may always be employed to advantage when the products to be purified are easily soluble in cold as well as in warm water, as, for example, when they display similar characteristics of solubility as the alkali or the alkali salts to be removed.

To conduct the process according to the invention, the hydroxy-lower-alkyl ethers of the galactomannans are first of all treated with glyoxal in the presence of an acid at elevated temperatures. For this purpose, the suspension obtained after the hydroxy-alkylation of the galactomannans may be suitably acidified with any acid chosen at random and finally admixed or contacted with glyoxal. In this manner a very uniform distribution of the glyoxal and at the same time an even cross-linking is achieved during the subsequent heating.

Furthermore it is possible to first isolate the hydroxy-lower-alkyl ethers of the galactomannans from the reaction mixture and then to admix the ethers with glyoxal under acid conditions after being dried beforehand. The acidification of the hydroxy-lower-alkyl ethers of the galactomannans may be carried out in the hydroxy-alkylation reaction mixture itself or after their isolation from the reaction mixture.

Following the acidification, the hydroxy-lower-alkyl ethers of the galactomannans are treated with from 0.2% to 2%, preferably with from 0.25% to 1.2% of glyoxal. For this treatment the hydroxy-lower-alkyl ethers of the galactomannans may be present as a suspension in an organic solvent. In this case, the glyoxal may be used in any formed desired, for example as aqueous solution or as solution in an organic solvent. The treatment is conducted at temperatures of about 40° to 90° C., preferably about 50° to 70° C. The time required for the treatment amounts to from about 15 minutes to a period of several hours. Thereafter, the glyoxal-treated hydroxy-lower-alkyl ethers of the galactomannans are separated, preferably by filtration or by centrifuging and finally dried.

The drying may be carried out in any manner chosen, for example in a drying chamber, or on drying rollers or on heated bands at temperatures of from 30° to 180° C., preferably from 70° to 150° C. During the drying a second reaction of the hydroxy-lower-alkyl ethers of the galactomannans with the glyoxal occurs.

When the acidified hydroxy-lower-alkyl ethers of the galactomannans are present in surface-dried, solid form, the treatment with glyoxal can be conducted appropriately so that the glyoxal, if necessary in form of a solution, is steamed or sprayed on the acidified dried ether. The reaction in this case is effected at temperatures of from 30° to 180° C., preferably from 70° to 150° C., during a reaction period lasting from about 5 minutes to 24 hours.

Following the glyoxal treatment and drying, the subsequent removal of the salts contained in the hydroxy-lower-alkyl ethers of the galactomannans is conducted by washing the glyoxal-treated product with from about two times to fifty times, in particular from about five times to thirty times, its amount, of water. The washing can be effected batchwise or continuously; if batchwise, wash water is appropriately used not all at one time, but in portions.

The temperature of the wash water should be between about 0° to 30° C., in particular between about 0° to 20° C. The wash water should have a pH of from 2 to 6, in particular from 3 to 5. As the treatment with glyoxal is usually conducted at a strongly acidic pH value, the amount of acid remaining in the product frequently suffices to give a pH value of from about 3 to 5 to the wash water without further acid addition.

For the complete washing out of the salts from the impure ethers, in general a contact with the wash water, under agitation, lasting from about 1 to 10 minutes will suffice. In the case where a satisfactorily strong cross-linking has been effected by glyoxal, the contact periods for the washing process may be prolonged for example to about one-half hour.

Following the washing of the salts, the purified hydroxy-lower-alkyl ethers of the galactomannans are recovered by filtration or by centrifuging. Thereafter, they are dried in any drying apparatus commonly used, for example on a drying roll or on a heated band. For some purposes of usage, it is advisable to grind the product after being dried.

The hydroxy-lower-alkyl ethers of the galactomannans purified according to the process of the invention, are obtained as white or, at best, as somewhat yellowish products. The ash content is low. The ash content, reported as sulfate ash, is definitely below 3%, and frequently even below 1.5%. The purified hydroxy-lower-alkyl ethers of the galactomannans in solution react, as a rule, in a slightly acid manner and exhibit in water a somewhat longer dissolving period than the unpurified hydroxy-lower-alkyl ethers of the galactomannans. Nevertheless, the rate of dissolution is sufficient for practical conditions.

It was further discovered that, by neutralizing the very small amounts of acids still present in the purified hydroxy-lower-alkyl ethers of the galactomannans, products may be obtained which have the same dissolving characteristics as the unpurified hydroxy-lower-alkyl ethers of the galactommannans. For example, the purified hydroxy-lower-alkyl ethers following the treatment with water, may again be suspended in an organic solvent and the suspension may be treated with small amounts of a compound with an alkaline reaction, for example caustic alkalis, sodium carbonate or ammonia. It is also possible to treat the dried, purified hydroxy-lower-alkyl ethers of the galactomannans with a gaseous amine or ammonia.

Lastly, to hasten the dissolving of the purified hydroxy-lower-alkyl ethers of the galactomannans, following the process described in the copending, commonly-assigned United States patent application Ser. No. 345,576, filed Feb. 18, 1964 now U.S. Patent No. 3,297,583, the pH value of the dissolving medium may be shifted, after the introduction of the hydroxy-lower-alkyl ethers of the galactomannans, into the alkaline range. By these methods, a very rapid dissolution, free of lumps, of the hydroxy-lower-alkyl ethers of the galactomannans is effected. As the purified hydroxy-lower-alkyl ethers contain only traces of acids, only very insignificant amounts of salt are formed and introduced into the solution by means of this treatment.

The following specific embodiments are illustrative of the invention. It is to be understood however that other expedients may be employed and that these embodiments are not to be construed as limitative.

Example 1

While stirring, 284 gm. of air-dried guar flour (moisture content 12%) were suspended in 750 ml. of isopropanol. While constantly stirring, over a period of one-half hour, 500 gm. of a 15% aqueous sodium hydroxide solution were admixed therewith. Thereafter, the mixture was heated to 50° C., and a mixture of 200 gm. of ethylene oxide and 200 ml. of isopropanol were added dropwise over a period of one-half hour. The stirring was continued for a further 4 hours while maintaining the temperature at 50° C. At the start of the reaction period exterior cooling was necessary for this purpose.

The reaction mixture was acidified with hydrochloric acid, then was admixed with 3.2 gm. of 30% aqueous glyoxal solution under stirring and the stirring was continued for a further one-half hour, at a temperature of 50° C.

The product obtained was filtered off and dried in a vacuum dryer at a temperature of 70° C. Then the product was twice suspended, each time in 2.5 l. of water at a temperature of 5° C., and after 2 minutes filtered. Finally, the purified guar ether was dried on a drying roller and pulverized.

In this manner 340 gm. of a colorless powder were obtained having a sulfate ash content of 1.7%. The purified guar ether could be stirred into water without lumps and it was completely dissolved after 50 minutes. The pH value of a 2% solution was 5.8.

When the suspension of the purified guar ether in water was neutralized with slightly diluted ammonium hydroxide solution, complete dissolution took only 5 minutes.

Example 2

150 gm. of air-dried locust bean flour (with a moisture content of 10.7%) were suspended while stirring in 750 ml. of isopropanol. Then 200 gm. of a 15% aqueous sodium hydroxide solution was admixed therewith and the mixture was stirred for 1 hour at room temperature. Thereafter, it was heated to 50° C. and a solution of 100 gm. of ethylene oxide in 100 ml. of isopropanol were added dropwise over a period of one-half hour. The mixture was stirred for a further 4 hours at a temperature of 50° C.

The reaction mixture was acidified by an addition of 95 gm. of a 30% aqueous hydrochloric acid solution. 2.5 gm. of 30% aqueous glyoxal solution was admixed therewith and the mixture was stirred for a further one-half hour at 50° C.

The hydroxyethyl ether of the locust bean flour was filtered off and dried in the vacuum dryer at a temperature of 70° C. Then the product was stirred twice, each time in 2 l. of water at a temperature of 12° C. and filtered after 5 minutes. Finally, the product, thus purified, was dried on a drying roller and pulverized.

192 gm. of a slightly yellow powder were obtained having a sulfate ash content of 1.2%. The powder could be stirred into water without forming lumps, and it was completely dissolved after 60 minutes. The pH value of a 2% solution was 5.3.

When the suspension of the purified hydroxyethyl ether of the locust bean flour was neutralized in water with sodium hydroxide solution, the time for dissolving amounted to only 10 minutes.

Example 3

Under constant stirring, 300 gm. of an aqueous 15% sodium hydroxide solution were added to 150 gm. of air-dried guar flour (having a moisture content of 12%) in 600 ml. of isopropanol within a period of one-half hour at room temperature. Next, the mixture was heated to 50° C. and a solution of 150 gm. of propylene oxide in 150 ml. of isopropanol were added dropwise over a period of one-half hour. Then the reaction mixture was stirred for a further 5 hours at 50° C.

The reaction mixture was neutralized with hydrochloric acid, the guar ether was filtered off and then dried in the vacuum dryer at a temperature of 70° C. 290 gm. of a slightly yellowish product were obtained, which product was completely dissolved in water. This product had a sulfate ash content of 23.5%.

150 gm. of this product, with a sulfate ash content of 23.5%, were dispersed in 400 ml. of a 90% aqueous isopropanol solution and admixed with 2 ml. of concentrated hydrochloric acid and 5 gm. of a 30% aqueous glyoxal solution. Then the reaction mixture was stirred for one-half hour at 50° C. Next, the mixture was filtered and dried in the vacuum dryer at a temperature of 70° C. The dried product was stirred with 4 l. of water at 5° C. for 5 minutes, filtered and dried on a dryer roller. After the grinding a white powder was obtained with a sulfate ash content of 2.3%.

The product could be stirred into water without lumps and was completely dissolved after 40 minutes. The pH value of a 2% solution was 5.6.

The preceding specific embodiments are illustrative of the invention. It is to be understood however that other expedients may be employed without departing from the spirit of the invention or the scope of the appended claims.

We claim:

1. A process for the purification of a hydroxy-lower-alkyl ether of galactomannan which comprises the steps of contacting an impure hydroxy-lower-alkyl ether of galactomannan having a sulfate ash content in excess of 3%, at an acid pH value with glyoxal, separating the reaction product, washing the reaction product with water having a pH of from 2 to 6 at a temperature of from 0° C. to 30° C. and recovering a purified hydroxy-lower-alkyl ether of galactomannan having a low sulfate ash content.

2. The process of claim 1 wherein said hydroxy-lower-alkyl ether of galactomannan to be purified is selected from the group consisting of hydroxyethyl ether of galactomannan and hydroxypropyl ether of galactomannan.

3. A process for the purification of a hydroxy-lower-alkyl ether of galactomannan which comprises the steps of contacting a dispersion of an impure hydroxy-lower-alkyl ether of galactomannan having a sulfate ash content in excess of 3%, in a liquid dispersing medium, with from about 0.2% to about 2% of glyoxal, based on the weight of said impure ether, at a pH of between about 2 and 6 and at a temperature of between about 40° C. to about 90° C., separating the reaction product, drying the reaction product, washing the dried reaction product with from 2 to 50 parts, based on the weight of the dried reaction product, of water having a pH of from 2 to 6 and at a temperature of from 0° C. to 30° C., and recovering a purified hydroxy-lower-alkyl ether of galactomannan having a sulfate ash content of below 3%.

4. A process for the purification of a hydroxy-lower-alkyl ether of galactomannan which comprises the steps of contacting a dispersion of an impure hydroxy-lower-alkyl ether of galactomannan having a sulfate ash content in excess of 3%, in an aqueous organic dispersing medium, with from about 0.25% to about 1.2% of glyoxal, based on the weight of said impure ether, at a pH of between about 3 to 5 and at a temperature of between about 50° C. and 70° C., separating the reaction product, drying the reaction product at a temperature of between 70° C. and 150° C., washing the dried reaction product with from about 5 to about 30 parts, based on the weight of the dried reaction product, of water having a pH of from 3 to 5 at a temperature of from 0° C. to 20° C., separating and drying the washed product, and recovering a dried, purified hydroxy-lower-alkyl ether of galactomannan having a sulfate ash content of below 3%.

5. The process of claim 4 wherein the dispersion of said impure hydroxy-lower-alkyl ether of galactomannan is obtained by the in situ reaction of a lower-alkylene oxide with galactomannan in the presence of an alkali and an aqueous organic dispersing medium and said dispersion is neutralized by a mineral acid to a pH of 3 to 5 before contacting said dispersion with glyoxal.

6. The process of claim 4 wherein said hydroxy-lower-alkyl ether of galactomannan to be purified is selected from the group consisting of hydroxyethyl ether of galactomannan and hydroxypropyl ether of galactomannan.

7. The process of claim 4 wherein the separated water-washed reaction product is treated with an acid-binding substance.

References Cited

UNITED STATES PATENTS

| | | | |
|---|---|---|---|
| 2,644,762 | 7/1953 | Frisch et al. | 260—209 |
| 2,644,765 | 7/1953 | Frisch et al. | 260—209 |
| 2,803,558 | 8/1957 | Fronmuller | 260—209 |
| 2,976,274 | 3/1961 | McNeely et al. | 260—209 |
| 3,031,319 | 4/1962 | Lancaster | 260—209 |

LEWIS GOTTS, *Primary Examiner.*

J. R. BROWN, *Assistant Examiner.*